United States Patent [19]

Stummer

[11] Patent Number: 4,807,221
[45] Date of Patent: Feb. 21, 1989

[54] DIGITAL SIGNAL MULTIPLEX DEVICE

[75] Inventor: Baldur Stummer, Munich, Fed. Rep. of Germany

[73] Assignee: Siemens Aktiengesellschaft, Berlin and Munich, Fed. Rep. of Germany

[21] Appl. No.: 801,289

[22] Filed: Nov. 25, 1985

[30] Foreign Application Priority Data

Nov. 27, 1984 [DE] Fed. Rep. of Germany ....... 3443239

[51] Int. Cl.⁴ .............................................. H04J 3/06
[52] U.S. Cl. .................................... 370/102; 370/112
[58] Field of Search ..................... 370/102, 112, 110.1, 370/99, 84; 375/106, 112

[56] References Cited

U.S. PATENT DOCUMENTS

| | | | |
|---|---|---|---|
| 3,987,248 | 10/1976 | Platet et al. | 370/102 |
| 4,244,046 | 1/1981 | Brouard et al. | 370/84 |
| 4,322,844 | 3/1982 | Fellinger et al. | 370/84 |
| 4,484,327 | 11/1984 | Hanson | 370/84 |
| 4,535,451 | 8/1985 | Drupsteen | 370/102 |
| 4,542,503 | 9/1985 | Fladerer et al. | 370/84 |

FOREIGN PATENT DOCUMENTS 2814000 10/1979 Fed. Rep. of Germany .
2814001 10/1979 Fed. Rep. of Germany .
3213534 10/1983 Fed. Rep. of Germany .

OTHER PUBLICATIONS

Auer et al., "Hierachie . . . CCITT.Normen," telcom report, 1979, vol. 2, pp. 16–20.
CCITT Yellow Book, 1981, vol. 3, Fascide 111.3, pp. 218–220.
Huang et al., "Image Processing In Communication System,", 1972, Int. Zurich Seminar . . . Communications, pp. A2(1)–A2(7).

Primary Examiner—Douglas W. Olms
Assistant Examiner—Curtis Kuntz

[57] ABSTRACT

A digital signal multiplex device converts k pleisochronic 564.992 Mbit/s signals or 4·k plesiochronic 139.264 Mbit/s signals or signals of both types into synchronous intermediate time division multiplex signals of a bit rate of 600.832 Mbit/s or, respectively, 621.776 Mbit/s, the conversion occurring by way of a special pulse frame having 544 or, respectively, 1056 time slots. The device then interlaces these intermediate time division multiplex signals pulse-frame wise with a multiplexer. A conversion in the opposite direction occurs in demultiplexing. The digital signal multiplex device may be employed as a line multiplexer in line terminal equipment for light wave guide links.

13 Claims, 9 Drawing Sheets

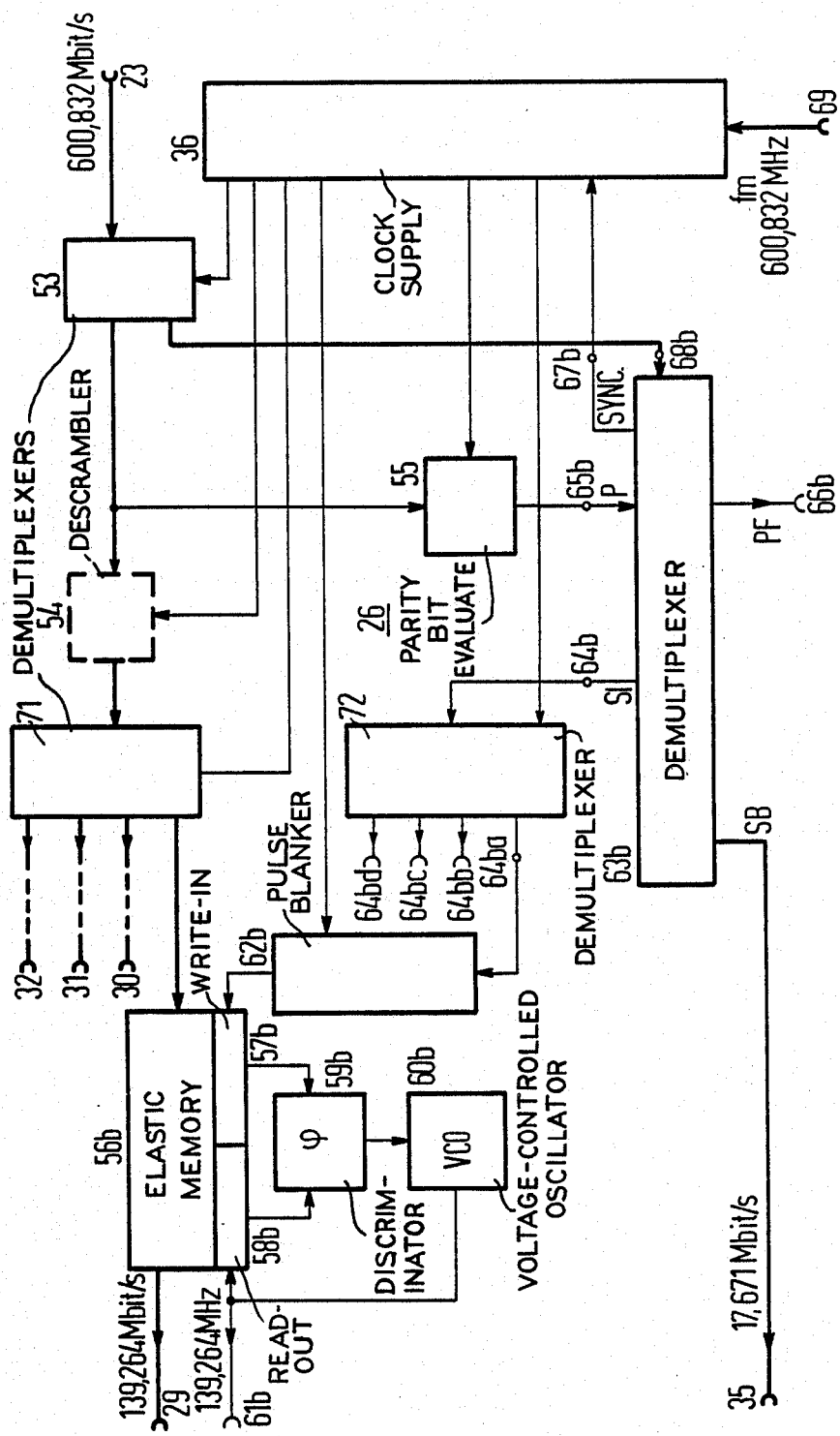

DIGITAL SIGNAL MULTIPLEX DEVICE

BACKGROUND OF THE INVENTION

1. Field of the Invention

The present invention relates to a digital signal multiplexer comprising a multiplexing portion in which first plesiochronic 139.264 Mbit/s signals or 564.992 Mbit/s signals in first channel portions are converted by stuffing and superimposing of auxiliary signals into first synchronous intermediate time division multiplex signals and in which a multiplexer interleaves these bit-by-bit into a first time division multiplex signal of a higher order, and comprising a demultiplexer portion in which a second time division multiplex signal of higher order is separated by a demultiplexer into second intermediate time division multiplex signals and in which these are converted in second channel portions into plesiochronic 139.264 Mbit/s signals or 564.992 Mbit/s signals upon destuffing and desuperimposing.

2. Description of the Prior Art

A multiplex and demultiplex arrangement of a type generally set forth above is disclosed in the German allowed and published applications 28 14 000 and 28 14 001.

A European hierarchy has been created for digital transmission systems, the hierarchy being described in the periodical "Telcom Report", Vol. 2, 1979, Special Issue, Digital Transmission, pp. 16–20. The fourth level of this hierarchy works with a bit rate of 139.264 Mbit/s. The American hierarchy contains bit rates of 1.544 Mbit/s, 3.152 Mbit/s, 6.312 Mbit/s, 44.736 Mbit/s and 274.176 Mbit/s.

The CCITT Yellow Book, Vol. III-Fascicle III.3, Digital Networks-Transmission Systems and Multiplexing Equipment, Geneva, Nov. 10-21, 1980, pp. 218–220, recommends a line multiplexer which converts four 139.264 Mbit/s signals into one 564.992 Mbit/s signal and vice-versa.

SUMMARY OF THE INVENTION

The object of the present invention is to provide a digital signal multiplexer which combines k plesiochronic 564.992 Mbit/s signals, 4·k plesiochronic 139.264 Mbit/s signals or (k−x) plesiochronic 564.992 Mbit/s signals with 4·x plesiochronic 139.264 Mbit/s signals to form a time division multiplex signal or vice-versa. In these relationships, k and x are whole numbers.

Proceeding from a digital signal multiplexer of the type initially mentioned, the above object is achieved in accordance with the invention in that, for 564.992 Mbit/s signals, every $n^{th}$ time slot in the pulse frame of the intermediate time division multiplex signals is provided for auxiliary signals and the remaining time slots are provided for the main information to be transmitted and for a first stuffable bit; in that, for respectively four 139.264 Mbit/s signals, every nth time slot in a pulse frame of the intermediate time division multiplex signals are provided for auxiliary signals and the remaining time slots are provided for the four main information to be transmitted interlaced bit-by-bit and for a respective first and m second stuffable bits; in that, for respectively four 139.264 Mbit/s signals, a superframe of four pulse frames is provided in which, among other things, a stuffing information and a channel number of a 139.264 Mbit/s signal are inserted in every pulse frame as auxiliary signals; and in that the second channel portions are provided for a reconversion from the same pulse frame.

In a first modification of the above structure, the bit rate of 600.832 Mbit/s, a pulse frame having 544 time slots, $n=17$ and $m=1$ are selected for the intermediate time division multiplex signals.

An advantageous embodiment of the foregoing modification of the apparatus provides that the pulse frame is subdivided into four sets each having 136 time slots; in that, in the sequence of the 17 time slots in the first set, the first five time slots are provided for a frame recognition word, the sixth and seventh time slots are cyclically provided for the channel number and the eighth time slot is provided for a first parity bit regarding the main information bits in the second and third sets of the preceding pulse frame; in that, in the sequence of the seventeenth time slots in the second and fourth sets, these are provided for service information; and in that, in the sequence of the seventeenth time slots in the third set, the first five time slots are provided for a stuffing information, the sixth and seventh time slots are provided for an order number of the intermediate time division multiplex signal to be formed, and the eighth time slot is provided for a second parity bit regarding the main information bits in the fourth set of the preceding pulse frame and in the first set of the current pulse frame.

What is meant by service information are the signals necessary for the administration of the overall transmission system such as telemetry signals or service calls. Transmission capacity which is not required, however, can also be utilized, for example, for the execution of regional traffic along the high-rate long-distance traffic route.

It is likewise advantageous when, for four 139.264 Mbit/s signals, the $128^{th}$ through $131^{st}$ time slots in the third set are provided for first stuffable bits, when the $128^{th}$ through $131^{st}$ time slots in the first set are respectively provided for second stuffable bits, when the first stuffable bit in the 139.264 Mbit/s signals whose channel number resides in the respective pulse frame is stuffed dependent on the stuffing information in this pulse frame or is occupied with main information and when all other first and second stuffable bits are stuffed in fixed fashion.

In accordance with a second modification of the above equipment, a bit rate of 621.776 Mbit/s, a pulse frame having 1056 time slots, $n=11$ and $m=3$ and $m=2$ in alternation are selected for the intermediate time division multiplex signals. A 47.104 Mbit/s signal, i.e. a 44.736 and a 1.544 Mbit/s signal can be transmitted here for service information.

An advantageous embodiment of the second modification provides that the pulse frame is subdivided into four sets each having 264 time slots; in that, in the sequence of the eleventh time slots, eleven time slots are provided for a frame recognition word, for the channel number, for an order number of the intermediate time division multiplex signal to be formed, and for parity bits regarding the main information of the preceding pulse frame; in that, in the sequence of the eleventh time slots, 80 time slots are provided for service information; and in that, in the sequence of the eleventh time slots, five time slots are provided for stuffing information.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 9 is a block diagram of a second channel portion for 4×139.264 Mbit/s.

DESCRIPTION OF THE PREFERRED EMBODIMENTS

Figure 1:
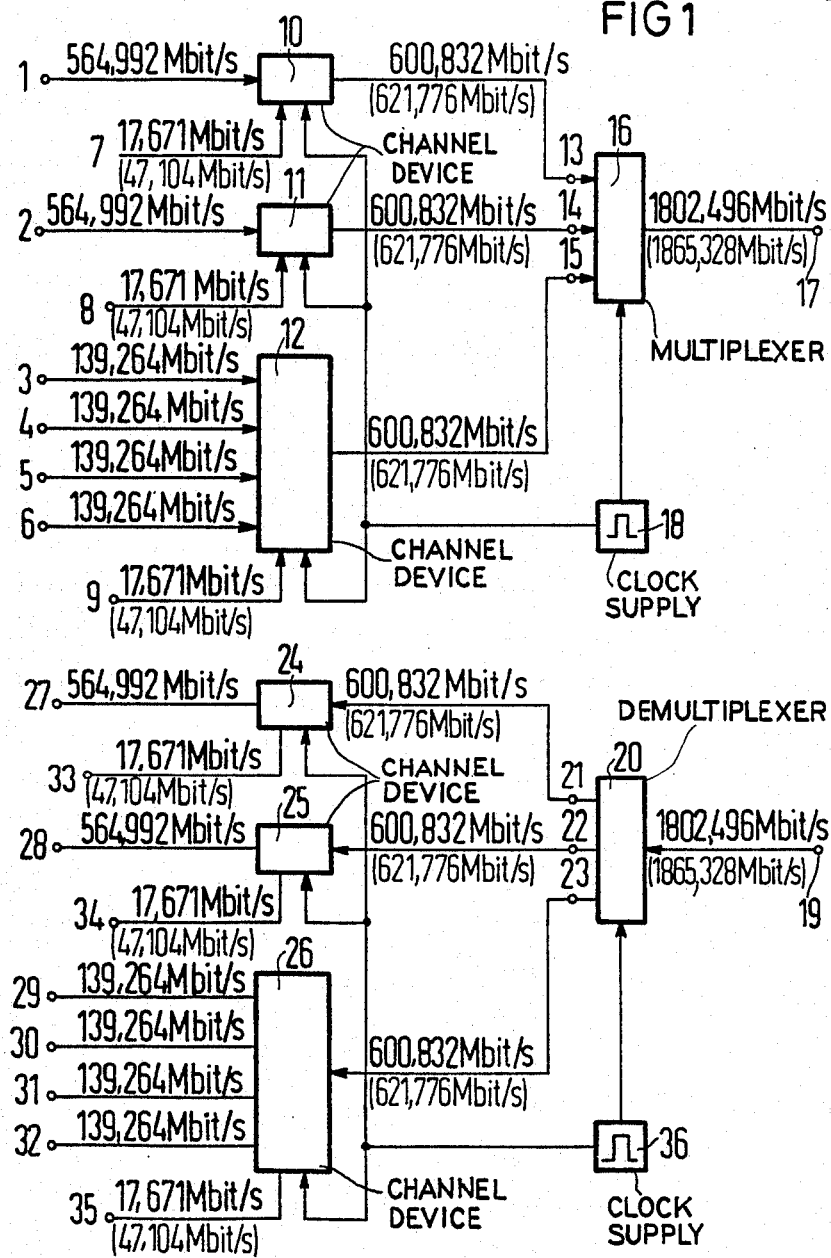
FIG. 1 is a block diagram of a digital signal multiplex device constructed in accordance with the present invention.

FIG. 1 illustrates a digital signal multiplex device constructed in accordance with the present invention and in which k=3 and x=1. The device contains a multiplexer portion 1-18 and a demultiplexer portion 19-36.

The multiplexer portion contains channel portions 10 and 11 comprising a respective input 1, 2 for 564.992 Mbit/s signals and a channel portion 12 comprising inputs 3-6, each for a 139.264 Mbit/s signal. All channel portions 10-12 contain an input 7-9 for service bits of a bit rate of 17.671 Mbit/s or, respectively, 47.104 Mbit/s. The multiplexer portion further contains a multiplexer 16 comprising inputs 13-15 which are respectively connected to the outputs of the channel portions 10-12 for the transmission of intermediate time division multiplex signals having a bit rate of 600.832 Mbit/s. A 1802.496 Mbit/s signal can be taken at the output 17 of the multiplexer 16. A central clock 18 supplies the channel portions 10-12 and the multiplexer 16 with clock pulses.

The demultiplexer portion contains a demultiplexer 20 comprising an input 19 for a 1802.496 Mbit/s signal and outputs 21-23 for 600.832 Mbit/s intermediate time division multiplex signals. The demultiplexer portion further comprises channel portions 24-25 whose inputs are connected to a respective output 21 and 22 of the demultiplexer 20 and whose outputs 27 and 28 each output a 564.992 Mbit/s signal. Further contained therein is a channel portion 26 whose input is connected to an output 23 of the demultiplexer 20 and at whose outputs 29-32, 139.264 Mbit/s signals can be taken. bits having a bit rate of 17.671 Mbit/s or, respectively, 47.104 Mbit/s can be taken from each of the channel portions 24-26 at the outputs 33-35. A clock 36 supplies the channel portions 24-26 and the demultiplexer 20 with clock pulses.

The multiplexer 16 cyclically connects the inputs 13-15 to the output 17, while the demultiplexer 20 cyclically connects the input 19 to the outputs 21-23.

The manner of operation of the channel portions will be set forth hereinbelow in greater detail with reference to FIGS. 2-9.

Figure 2:
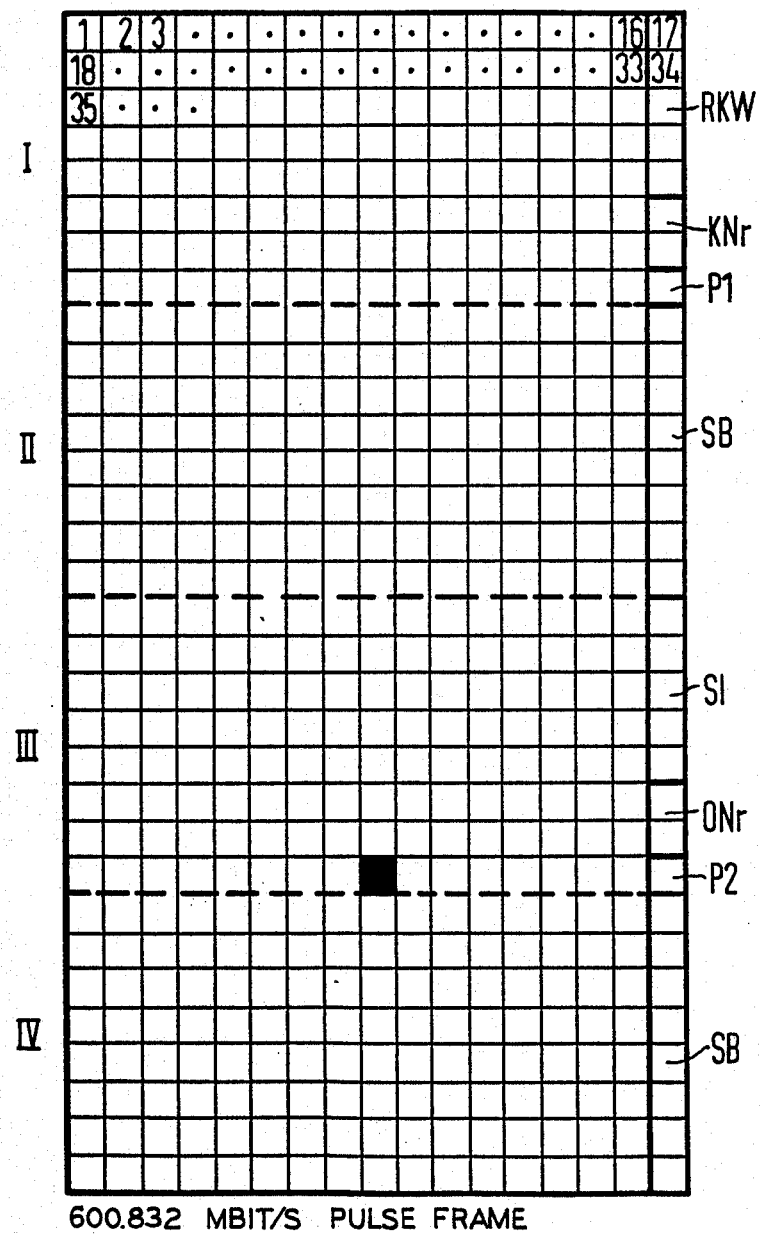
FIG. 2 is a pulse frame chart for intermediate time division multiplex signals.

FIG. 2 illustrates a pulse frame for the intermediate time division multiplex signals having the bit rate of 600.832 Mbit/s for the first modification mentioned above. This pulse frame contains 544 time slots. For the purpose of a surveyable illustration, the pulse frame has been divided into portions of 17 time slots and these portions have been arranged below one another in the form of 32 lines. Further, the pulse frame is divided into four parts I-IV each comprising 136 time slots. The sequence of the $17^{th}$ time slots which form the right-hand column serve for the acceptance of auxiliary information. The remaining column&serve for the acceptance of main information and stuffable bits.

The right-hand column for the auxiliary signal contains a frame recognition word RKW, a channel number KNr, parity bits P1 and P2, service bits SB, a stuffing information SI and an order number ONr.

When a 564.992 Mbit/s signal is transmitted, the black time slot is provided for a stuffable bit which is stuffed dependent on the stuffing information SI or also transmits a main information.

The channel number KNr is only of significance given the transmission of 139.264 Mbit/s signals.

The parity bit P1 provides a statement regarding the main information bits in the portions II' and III' of the preceding pulse frame; the parity bit P2 provides a statement regarding the main information in the portion IV' of the preceding pulse frame and in the portion I of the illustrated pulse frame. The order number ONr identifies the intermediate time division multiplex signals.

Figure 3:
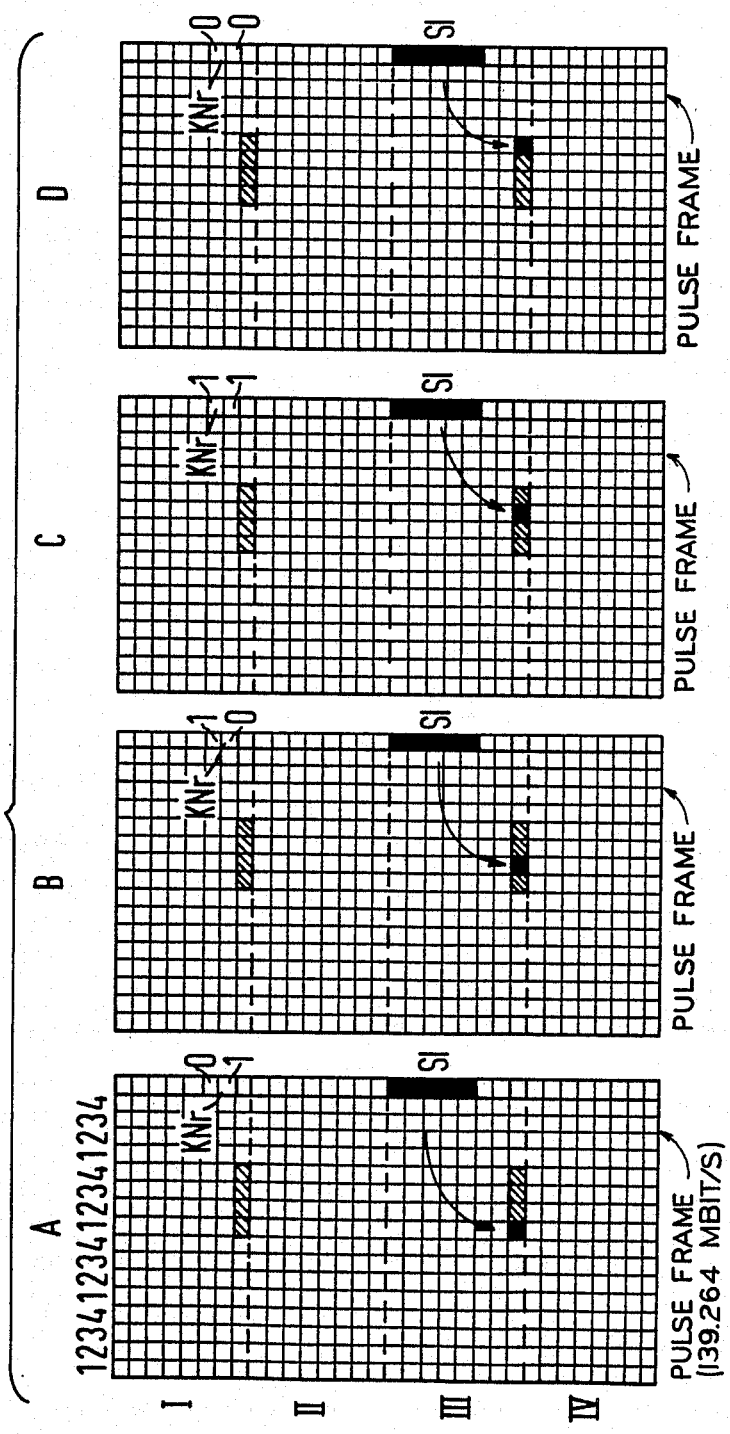
FIG. 3 is a superframe chart, the superframe being composed of four first pulse frames.

FIG. 3 illustrates four successive pulse frames A-D of the type of pulse frame shown in FIG. 2. The numerals at the upper side of the pulse frame A reference four 139.264 Mbit/s as signals interlaced bit-by-bit. A superframe of four pulse frames is formed for the channel numbers KNr and for the stuffing information SI, so that each 139.264 Mbit/s signal receives its own stuffing information SI and its own channel number KNr.

The bits identified with shading in the $17^{th}$ time slots outside of the auxiliary information are second stuffable bits in the portions I and are first stuffable bits in the portions III. The black time slot is stuffed dependent on the preceding stuffing information SI or transmits a main information. The shaded slots are respectively stuffed in a fixed manner, i.e. they are time slots which are superfluous given this operating mode.

Bit rates of the second modification mentioned above are specified in brackets in FIG. 1. The pulse frames in FIGS. 4 and 5 apply to these bit rates.

Figure 4:
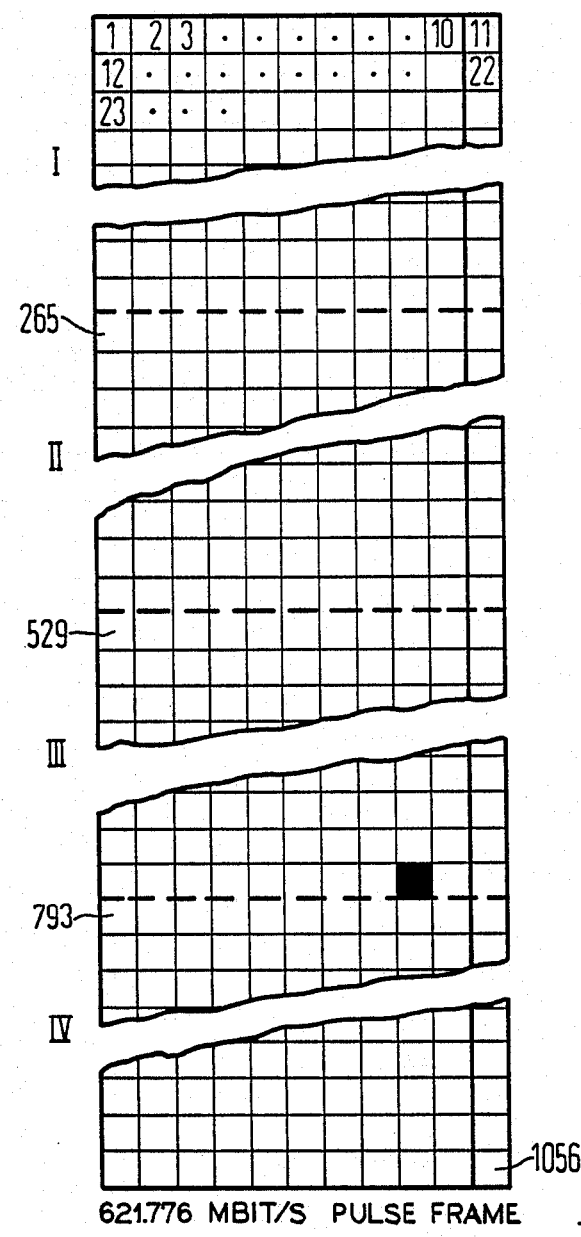
FIG. 4 is a second pulse frame chart for intermediate time division multiplex signals.

FIG. 4 illustrates a pulse frame for the intermediate time division multiplex signals having the bit rate of 621.776 Mbit/s. This pulse frame contains 1056 time slots. For the purpose of a surveyable illustration, the pulse frame has been divided into portions of eleven time slots and these portions have been arranged below one another in the form of 96 lines. Further, the pulse frame is subdivided into four portions I-IV having respectively 264 time slots. The sequence of the $11^{th}$ time slots which form the right-hand column serve for the acceptance of auxiliary information. The remaining columns serve for the acceptance of main information and stuffable bits.

The right-hand column for the auxiliary signals contains a frame recognition word, a channel number, parity bits, service bits, a stuffing information and an order number.

When a 564.992 Mbit/s signal is transmitted, the black time slot is provided for a stuffable bit which is stuffed dependent on the stuffing information or also transmits the main information.

The channel number is of significance only given the transmission of 139.264 Mbit/s signals.

Parity bits provide a statement regarding the main information bits in the pulse frame. The order number identifies the intermediate time division multiplex signals.

Figure 5:
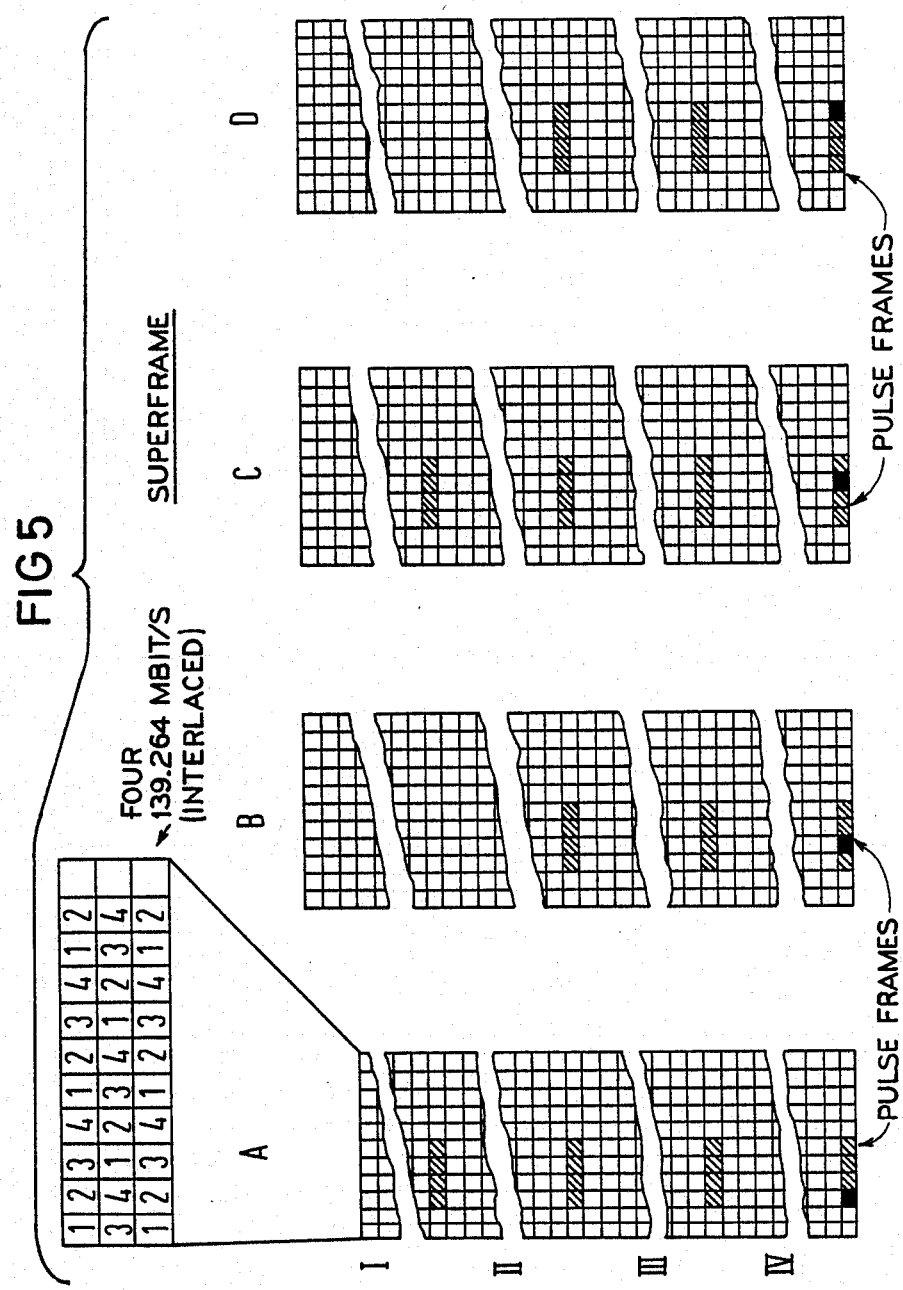
FIG. 5 illustrates a superframe composed of four second pulse frames.

FIG. 5 illustrates four successive pulse frames A–D of the type of pulse frame shown in FIG. 4. The numerals at the upper side of the pulse frame A, shown magnified, identify four 139.264 Mbit/s signals interlaced bit-by-bit. A superframe of four pulse frames A–D is formed for the channel numbers and the stuffing information, so that each 139.264 Mbit/s signal obtains its own stuffing information and its own channel number.

The bits identified with shading are second stuffable bits in the portions I, II and III and are first stuffable bits in the portions IV. The black time slot is stuffed dependent on the preceding stuffing information and transmitted in the main information. The shaded time slots are respectively stuffed in fixed fashion, i.e. are time slots which are superfluous given this operating mode. Each 139.264 Mbit/s signal accordingly contains 13 time slots stuffed in a fixed manner and one variably stuffed time slot in a superframe.

Figure 6:
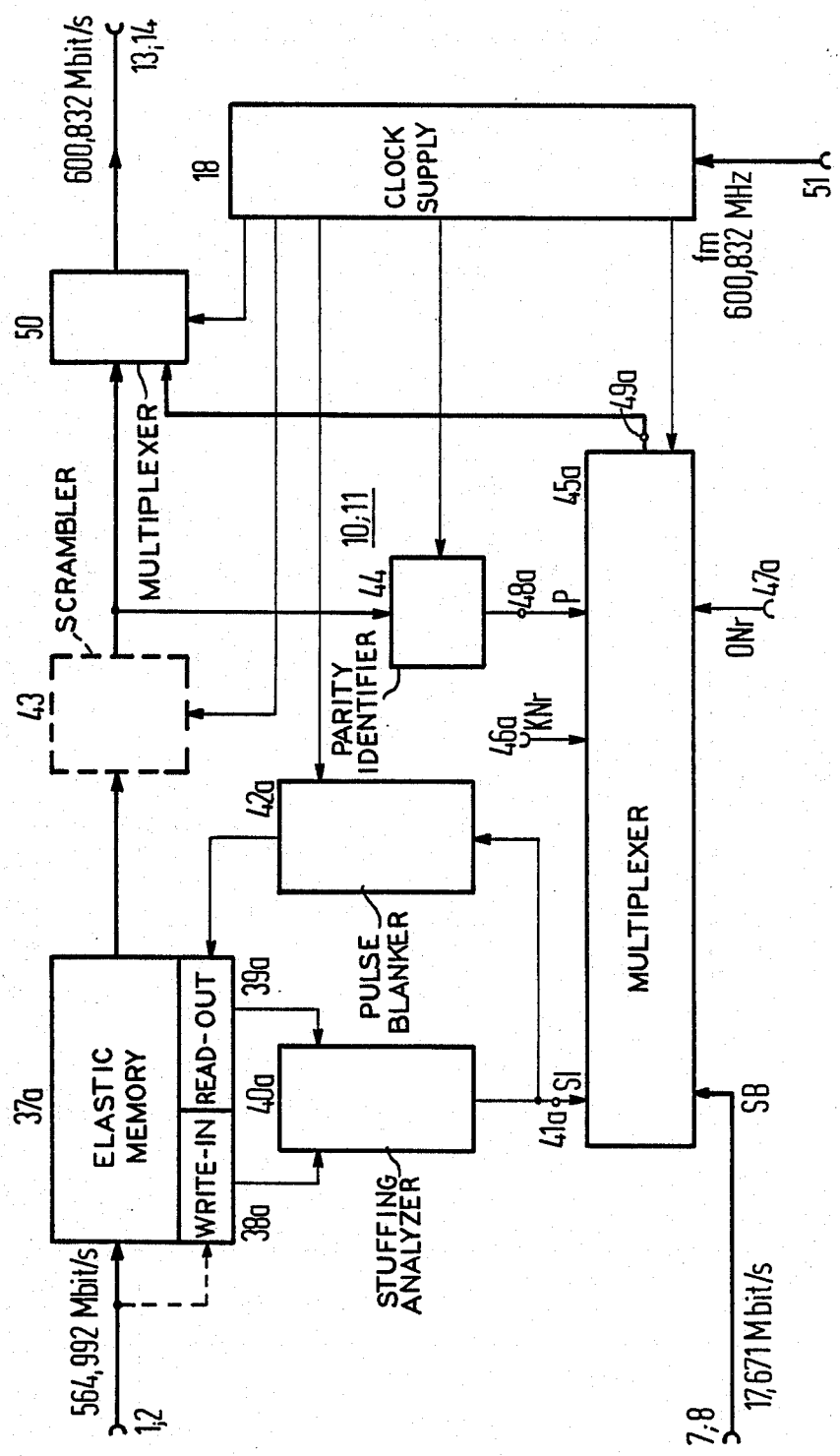
FIG. 6 is a block diagram of a first channel portion for 564.992 Mbit/s.

FIG. 6 illustrates a more detailed embodiment of the channel portions 10 or 11. Such a channel portion 10, 11 contains an input 1;2 for a 564.992 Mbit/s signal, an elastic memory 37a having a write-in portion 38a and a read-out portion 39a, a stuffing analyzer 40a, a stuffing information output 41a, a pulse blanker 42a a scrambler 43, a parity identifier 44, an input 7;8 for a 17.641 Mbit/s signal, a multiplexer 45 for auxiliary information, a multiplexer 50, an output 13;14 and a clock supply 18 comprising a clock input 51 for a 600.832 MHz clock.

A plesiochronic 564.992 Mbit/s signal is applied to the input 1;2 and is written into the elastic memory 37a with its clock via the write-in portion 38a. The clock supply 18 with the 600.832 MHz clock causes the read-out via the pulse blanker 42a and the read-out portion 39a. The stuffing analyzer 40a compares the write-in and the read-out clock and forwards stuffing information SI via the stuffing information output 41a to the multiplexer 45a and to the pulse blanker 42a which effects the stuffing. The output signal of the elastic memory 37a is supplied to the multiplexer 50 via the scrambler 43. Parity bits P are output to the input 48a by the parity identifier 44 whose input is connected to the output of the scrambler 43.

The multiplexer 45a combines the 17.641 Mbit/s signal containing service bits SB the input 7;8, the stuffing information SI, the channel number KNr at the input 46a, the order number ONr at the input 47a and the parity bits P at the input 48a to form a signal which is supplied via the output 49a, being likewise supplied to the multiplexer 50 which, in turn, outputs a 600.832 Mbit/s signal to the output 13;14.

The clock supply 18 supplies the multiplexers 45a and 50, the scrambler 43, the parity identifier 44 and the pulse blanker 42a with their clock signals.

Figure 7:
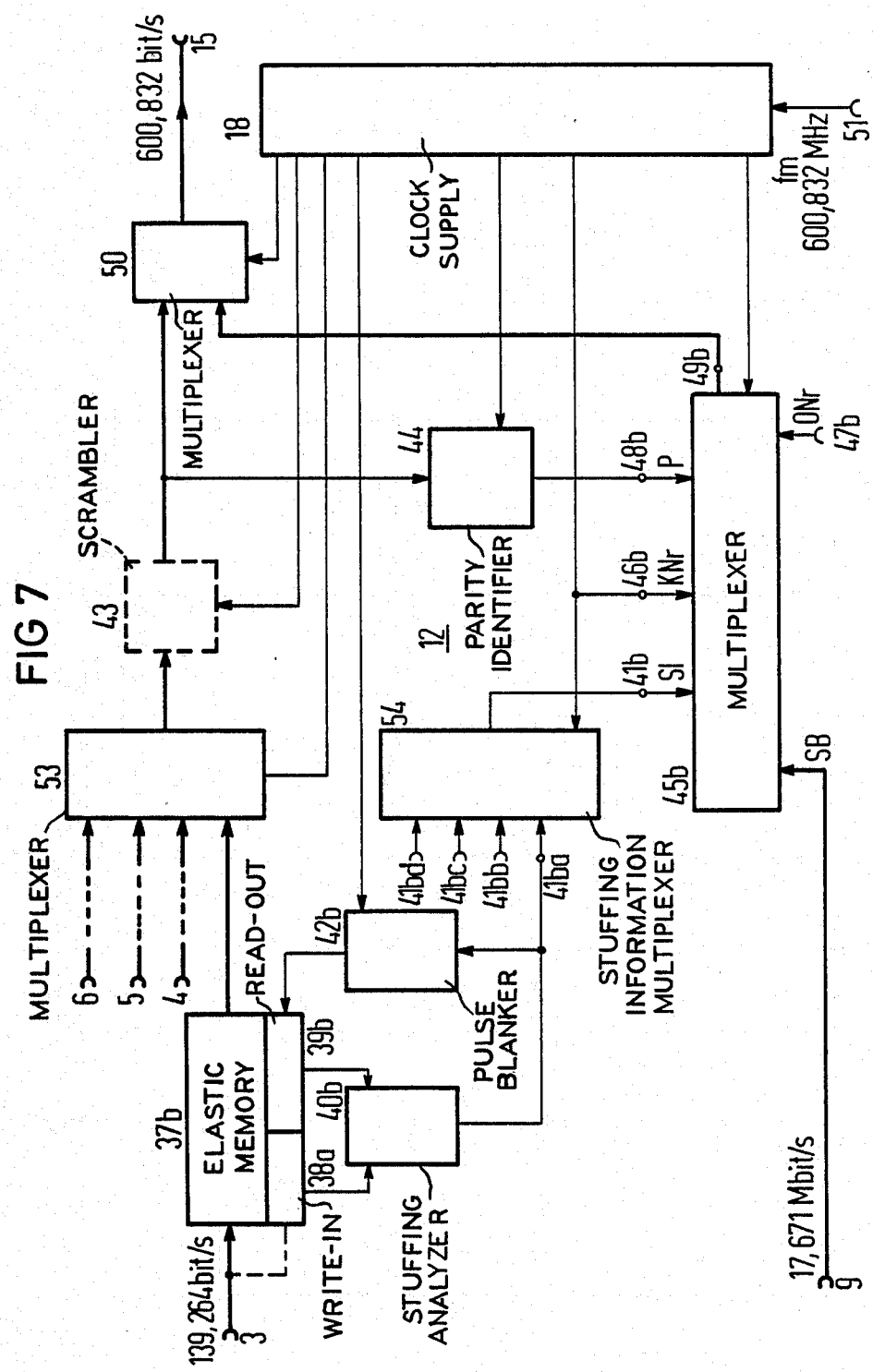
FIG. 7 is a block diagram of a first channel portion for 4×139.264 Mbit/s.

FIG. 7 illustrates the channel portion 12. The channel portion 12 contains four inputs 3–6 for 139.264 Mbit/s signals of which only one bearing the reference numeral 3 is illustrated. Accordingly, only one elastic memory 37b comprising a write-in portion 38b and a read-out portion 39b, one stuffing evaluator 40b and one pulse blanker 42b are also shown. A multiplexer 53, a stuffing information multiplexer 54, a scrambler 43, a multiplexer 50 comprising an output 15, a parity bit identifier 44, a multiplexer 45b for auxiliary information and the clock supply 18 are also contained in FIG. 7.

In contrast to the arrangement of FIG. 6, four 139.264 Mbit/s signals must first respectively traverse an elastic memory 37b before they are combined in the multiplexer 53 and before, as in the case of the channel portions 10 and 11 of FIG. 6, they are supplied via the scrambler 43 to the multiplexer 50. The stuffing information SI emitted by the four stuffing evaluations of the stuffing evaluators 40b via the stuffing information outputs 41ba–41bd are combined with the stuffing information at the stuffing information outputs 41bb, 41bc and 41bd, being combined in the stuffing information multiplexer 54 and being supplied via the input 41b to the multiplexer 45b. As in FIG. 6, service bits SB of a 17.641 Mbit/s signal at the input 9, the channel number KNr via the input 46b, parity bits via the input 48b and an order number ONr via the input 47b are further supplied into the multiplexer. The output signal of the multiplexer 45b is supplied by way of the output 49b, being likewise supplied to the multiplexer 50 which outputs a 600.832 Mbit/s signal at the output 15. The clock supply 18 functions in the same manner as that in the channel portion 10 of the channel portion 11 of FIG. 6; it merely has to supply four pulse blankings 42b.

Figure 8:
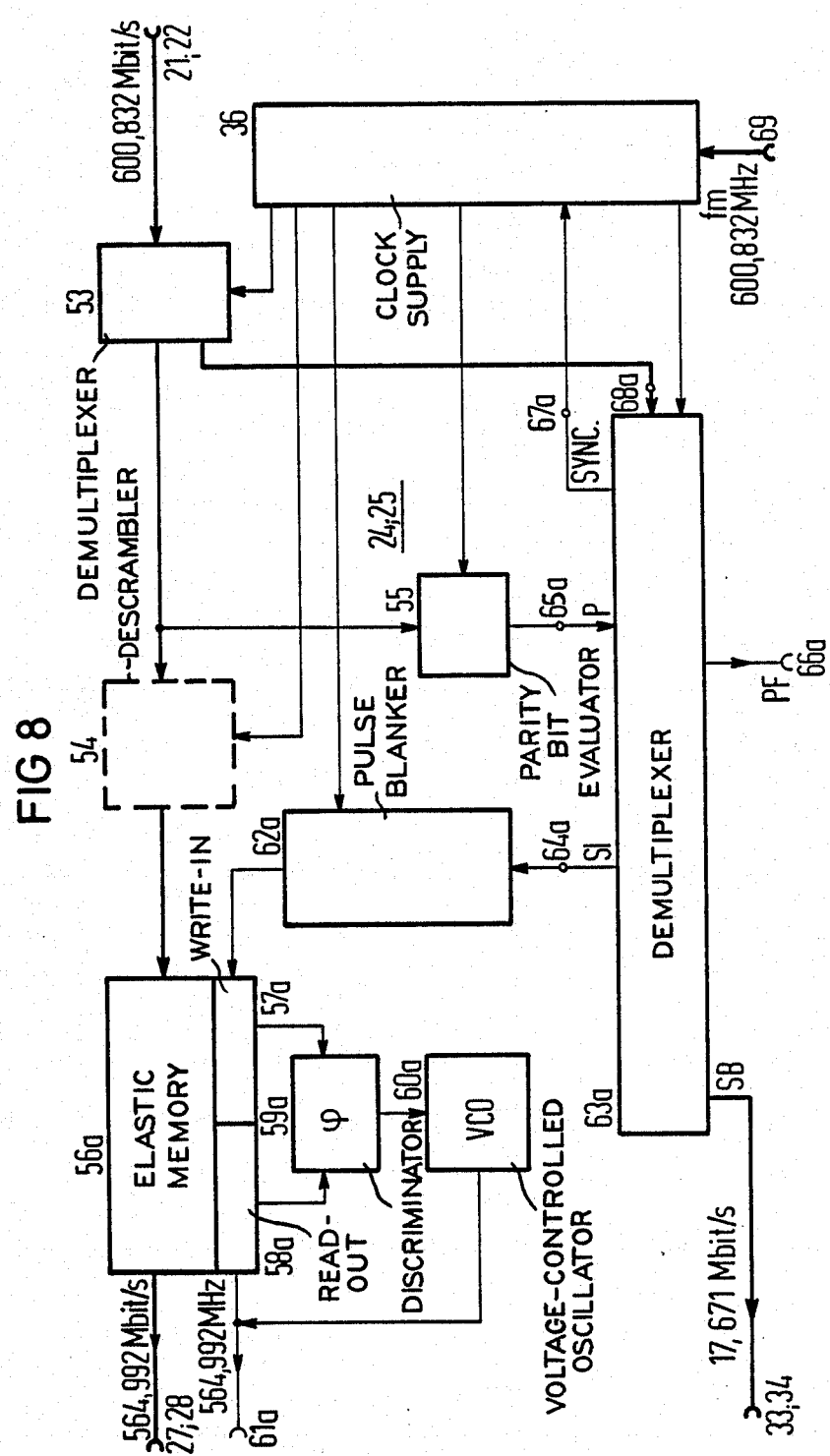
FIG. 8 is a block diagram of a second channel portion for 564.992 Mbit/s.

FIG. 8 illustrates a channel portion 24 or a channel portion 25. The channel portion comprises an input 21; 22 for a 600.832 Mbit/s signal, a demultiplexer 53, a descrambler 54, an elastic memory 56a comprising a write-in portion 57a and a read-out portion 58a, and an output 27;28 for a 564.992 Mbit/s signal, a discriminator 59a, a voltage-controlled oscillator 60a, an output 61a for a 564.992 MHz clock, a pulse blanker 62a demultiplexer 63a for auxiliary information, synchronization evaluation and parity bit evaluation comprising an input 68a and an output 65a for parity bits P, as well as comprising an output 33;34 for service bits SB in a 17.641 Mbit/s signal. It further comprises an output 66a for parity error signals PF and a synchronizing portion 67a, a parity identifier 55 and a clock supply 36 comprising a clock input 39 for a 600.832 MHz clock. The 600.832 Mbit/s signal supplied to the input 21;22 is divided such in the demultiplexer 53 that a signal is supplied via the descrambler 54 and the elastic memory 56a to the output 27;28 and the auxiliary information are supplied to the input 68a of the demultiplexer 63a. The latter outputs the stuffing information SI at the output 64a, the stuffing information destuffing the signal in the elastic memory 56a via the pulse blanker 62a together with the discriminator 59a and the voltage-controlled oscillator 60a. Further, the demultiplexer 63a outputs service bits SB at the output 33;34, the parity error signals PF at the output 66a, and a synchronizing signal for the clock supply 69a at the output 67a. The parity identifier 65 outputs its results P via the input 65a to the multiplexer 63a.

FIG. 9 illustrates the channel portion 26. In comparison to the channel portions 24 and 25 of FIG. 8, this channel portion contains a demultiplexer 71 following the descrambler 54, the demultiplexer 71 dividing its input signal into four signals which respectively proceed to the outputs 29–32 via an elastic memory 56b. Only one elastic memory 56b one discriminator 59b, one voltage-controlled oscillator 60b, one clock output 61b and a pulse blanker 62b for every output 29–32 are shown. The output 64b for stuffing information SI of the demultiplexer 63b is also followed by a stuffing information demultiplexer 72 which supplies the four pulse blankings 62b with individual stuffing information SI via the stuffing information outputs 64ba–64bd.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A digital signal multiplex device comprising:
a multiplex portion comprising first channel means for converting 564.992 Mbit/s signals into first synchronous intermediate time division multiplex signals in which every $n^{th}$ time slot in the pulse frame of the intermediate time division multiplex signals is provided for auxiliary signals and the remaining time slots are provided for the main information to be transmitted and for a first stuffable bit, second channel means for converting four 139.264 Mbit/s signals into the first synchronous intermediate time division multiplex signals in which every $n^{th}$ time slot in the pulse frame of the intermediate time division multiplex signals is provided for auxiliary signals and the remaining time slots are provided for the four main information to be transmitted interlaced bit-by-bit and for respectively one first and m second stuffable bits including means for providing for four 139.264 Mbit/s signals a superframe of four pulse frames in which a stuffing information and a channel number of a 139.264 Mbit/s signal are inserted in each pulse frame as auxiliary signals, and a multiplexer connected to said first and second channel means for interlacing the intermediate time division multiplex signals bit-by-bit to form a first time division multiplex signal of a higher order; and
a demultiplex portion for demultiplexing the first time division multiplex signal of a higher order into second intermediate time division multiplex signals, including third channel means for converting second intermediate time division multiplex signals into plesiochronic 564.992 Mbit/s signals by destuffing and blanking of auxiliary signals, and fourth channel means for converting second intermediate time division multiplex signals into plesiochronic 139.264 Mbit/s signals by destuffing and blanking of auxiliary signals.

2. The digital multiplex device of claim 1, wherein:
each of said first and second channel means comprises means for providing a bit repetition frequency of 600.832 Mbit/s and a pulse frame having 544 time slots, where $n=17$ and $m=1$ are selected for the intermediate time division multiplex signals.

3. The digital signal multiplex device of claim 2, wherein:
pulse frame dividing means divides the pulse frame into first, second, third and fourth sets each comprising 136 time slots in which in the sequence of the $17^{th}$ time slots of the first set the first five time slots are provided for a frame recognition word, the sixth and seventh time slots are cyclically provided for the channel number and the eighth time slot is provided for a first parity bit regarding the main information bits in the second and third sets of the preceding pulse frame, in which in the sequence of the $17^{th}$ time slots of the second and fourth sets, service information is provided, and in which in the sequence of the $17^{th}$ time slots of the third set the first five time slots are provided for a stuffing information, the sixth and seventh time slots are provided for an order number of the intermediate time division multiplex signal to be formed and the eighth time slot is provided for a second parity bit regarding the main information bits in the fourth set of the preceding pulse frame and in the first set of the current pulse frame.

4. The digital signal multiplex device of claim 2, wherein:
said first channel means comprises means operable with respect to a 564.992 Mbit/s signal to provide that the $128^{th}$ time slot in the third set is for the first stuffable bit to be stuffed dependent on the stuffing information or to transmit main information.

5. The digital signal multiplex device of claim 2, wherein:
said second channel means comprises, for the four 139.264 Mbit/s signals, means operable to provide the $128^{th}$ through $131^{st}$ time slots of the third set for first stuffable bits, to provide the $128^{th}$ through $131^{st}$ time slots in the first set for second stuffable bits, and to provide that the first stuffable bit in those 139.264 Mbit/s signals whose channel number is in the respective pulse frame is stuffed dependent on the stuffing information in the pulse frame or is occupied with main information, and to provide that all other first and second stuffable bits are stuffed in a fixed manner.

6. The digital signal multiplex device of claim 1, wherein:
said first and second channel means include means for providing a bit repetition frequency of 621.776 Mbit/s and a pulse frame comprising 1056 time slots, where $n=11$ and $m=3$ and $m=2$ in alternation are selected for the intermediate time division multiplex signals.

7. The digital signal multiplex device of claim 1, and further comprising:
means for providing that the pulse frames of the first intermediate time division multiplex signals are synchronous.

8. A digital signal multiplex device, comprising:
a multiplex portion including first channel means for converting 564.992 Mbit/s signals into first synchronous intermediate time division multiplex signals in which ever nth time slot and the pulse frame of the first intermediate time division multiplex signals is provided for auxiliary signals and the remaining time slots are provided for main information to be transmitted and a first stuffable bit,
second channel means for converting four 139.264 mbit/s signals into second synchronous intermediate time division multiplex signals in which every nth time slot in the pulse frame of the second intermediate time division multiplex signals is provided for auxiliary signals and the remaining time slots are provided for main information from the four 139.264 Mbit/s signals, transmitted interlaced bit-by-bit, and one first and m second stuffable bits,
means for providing the four 139.264 Mbit/s signals with a superframe of four pulse flames in each of which a stuffable information and a channel number of a 139.264 Mbit/s signal are inserted as auxiliary signals, and a multiplexer connected to said first and second channel means for interlacing the first and second intermediate time division multiplex signals bit-by-bit to form a first time division multiplex signal of a higher order;

bit repetition means for each of said first and second channel means for providing a bit repetition frequency of 621.776 Mbit/s and a pulse frame comprising 1,056 time slots, where n equals 11 and m equals 3 and m equals 2 in alternation; and a demultiplex portion for demultiplexing the first time division multiplex signal of a higher order into third intermediate time division multiplex signals including third channel means for converting the third intermediate time division multiplex signals into plesiochronic 564.992 Mbit/s signals by destuffing and blanking of the auxiliary signals, and fourth channel means for converting the third intermediate time division multiplex signals into plesiochronic 139.264 Mbit/s signals by destuffing and blanking of auxiliary signals.

9. The digital signal multiplex device of claim 8, wherein:

said second channel means comprises means operable with respect to the four 139.264 Mbit/s signals that the 256$^{th}$ through 259$^{th}$ time slots of the fourth set are provided for a first stuffable bit, that the 256$^{th}$ through 259$^{th}$ slot time in every second pulse frame in the first set are provided for second stuffable bits, that in the second and third sets, the respectively 256$^{th}$ through 259$^{th}$ time slots are provided for second stuffable bits, that the first stuffable bit in those 139.264 Mbit/s signals whose channel number resides in the respective pulse frame is stuffed dependent on the stuffing information in that pulse frame or is occupied with main information, and that all other first and second stuffable bits are stuffed in a fixed manner.

10. The digital signal multiplex device of claim 8, wherein:

pulse frame division means is provided for dividing the pulse frame into first, second, third and fourth sets each comprising 264 time slots, in which in the sequence of the eleventh time slots, eleven time slots are provided for a frame recognition word, for the channel number, for an order number of the intermediate time division multiplex signal to be formed, and for parity bits regarding the useful information bits of the preceding pulse frame, in which in the sequence of the eleventh time slots, 80 time slots are provided for service information, and in which in the sequence of the eleventh time slots, five time slots are provided for a stuffing information.

11. The digital signal multiplex device of claim 8, wherein:

said first channel means comprises means operable with respect to a 564.992 Mbit/s signal to selectively provide that the 256$^{th}$ time slot of the fourth set is provided for the first stuffable bit to be stuffed dependent on the stuffing information or to transmit main information.

12. A digital signal multiplex device, comprising:

a multiplex portion including first channel means for converting 564.992 Mbit/s signals into first synchronous intermediate time division multiplex signals in which every nth time slot in the pulse frame of the first intermediate time division multiplex signals is provided for auxiliary signals and the remaining time slots are provided for main information to be transmitted and a first stuffable bit, second channel means for converting four 139.264 Mbit/s signals into second synchronous intermediate time division multiplex signals in which every nth time slot in the pulse frame of the second intermediate time division multiplex signals is provided for auxiliary signals and the remaining time slots are provided for main information from the 139.264 Mbit/s signals, transmitted interlaced bit-by-bit, and one first and m second stuffable bits, means for providing the four 139.264 Mbit/s signals with a superframe of fourth pulse frames in each of which stuffing information and a channel number of a 139.264 Mbit/s signal are inserted as auxiliary signals, and a multiplexer connected to said first and second channel means for interlacing the first and second intermediate time division multiplex signals bit-by-bit to form a first time division multiplex signal of a higher order;

a demultiplex portion for demultiplexing the first time division multiplex signal of a higher order into third intermediate time division multiplex signals, including third channel means for converting the third channel time division multiplex signals into plesiochronic 564.992 Mbit/s signals by destuffing and blanking of the auxiliary signals, and fourth channel means for converting the third intermediate time division multiplex signals into plesiochronic 139.264 Mbit/s signals by destuffing and blanking of the auxiliary signals;

bit repetition frequency means for each of said first and second channels for providing a bit repetition frequency of 600.832 Mbit/s and a pulse frame having 544 time slots, where n equals 17 and m equals 1; and pulse frame division means for dividing the pulse frame into first, second, third, and fourth sets, each st comprising 136 time slots in which in the sequence of the 17th time slots of the first set, the first five time slots are provided for a frame recognition word, the sixth and seventh time slots are cyclicly provided for the channel number and the eighth time slot is provided for a first parity bit regarding the main information bits in the second and third sets of the preceding pulse frame, in which in the sequence of the 17th time slots of the second and fourth sets, service information is provided, and in which iu the sequence of the 17th time slots of the third set, the first five time slots are provided for stuffing information, the sixth and seventh time slots are provided for an order number of the intermediate time division multiplex signal to be formed and the eighth time slot is provided for a second parity bit regarding the main information bits in the fourth set of the preceding pulse frame and in the first set of the current pulse frame.

13. A digital signal multiplex device, comprising:

a multiplex portion including first channel means for converting 564.992 Mbit/s signals into first synchronous intermediate time division multiplex signals in which every nth time slot in the pulse frame of the first intermediate time division multiplex signals is provided for auxiliary signals and the remaining time slots are provided for main information to be transmitted and a first stuffable bit, second channel means for converting four 139.264 Mbit/s signals into second synchronous intermediate time division multiplex signals in which every nth time slot in the pulse frame of the second intermediate time division multiplex signals is provided for auxiliary signals and the remaining time slots are provided for main information from the four 139.264 Mbit/s signals, transmitted interlaced bit-by-bit, and one first and m second stuffable bits, means for providing the four 139.264 Mbit/s signals with a superframe of four pulse frames in which stuffing information and a channel number of a 139.264 Mbit/s signal are inserted as auxiliary signals, and a multiplex connected to said first and second channel means for interlacing the first and second intermediate time division multiplex signals bit-by-bit to form a first time division multiplex signal of a higher order;

bit repetition means for each of said first and second channels for providing a bit repetition frequency of 600.832 Mbit/s and a pulse frame having 544 time slots, where n equals 17 and m equals 1;

pulse frame division means for dividing the pulse frame into first, second, third, and fourth sets; and means operable and associated with said second channel means for providing for the four 139.264 Mbit/s signals, the 128th through 131st time slots of the third set for first stuffable bits, the 128th through 131st time slots in the first set for second stuffable bits, that the first stuffable bit in does 139.264 Mbit/s signals whose channel number is in the respective pulse frame is stuffed dependent on the stuffing information in the pulse frame or is occupied with main information, and that all other first and second stuffable bits are stuffed in a fixed manner.

* * * * *